US008885029B2

(12) United States Patent
Baek et al.

(10) Patent No.: US 8,885,029 B2
(45) Date of Patent: Nov. 11, 2014

(54) STEREOSCOPIC IMAGE DISPLAY

(75) Inventors: Seungho Baek, Gyeonggi (KR); Juseong Park, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 847 days.

(21) Appl. No.: 13/110,379

(22) Filed: May 18, 2011

(65) Prior Publication Data
US 2012/0140052 A1    Jun. 7, 2012

(30) Foreign Application Priority Data

Dec. 7, 2010 (KR) ........................ 10-2010-0124501

(51) Int. Cl.
*H04N 13/04* (2006.01)
*G02F 1/1343* (2006.01)
*G02F 1/23* (2006.01)
*G02F 1/01* (2006.01)
*G09G 3/36* (2006.01)
*G02B 27/26* (2006.01)
*G09G 3/00* (2006.01)

(52) U.S. Cl.
CPC .............. *G09G 3/3688* (2013.01); *G02B 27/26* (2013.01); *G09G 3/003* (2013.01); *H04N 13/0434* (2013.01); *H04N 13/0436* (2013.01); *H04N 13/0452* (2013.01); *G09G 3/3648* (2013.01); *G09G 2300/0443* (2013.01)
USPC ................. 348/51; 348/55; 349/139; 349/33; 349/41; 349/46

(58) Field of Classification Search
CPC ................... G09G 2310/06; G09G 2300/043; G09G 2300/0439; G09G 2300/0443; G09G 2300/0452; G09G 2320/0223; H04N 13/0452
USPC ............................................ 345/92
See application file for complete search history.

(56) References Cited

U.S. PATENT DOCUMENTS

| | | | |
|---|---|---|---|
| 2010/0265230 A1 | 10/2010 | Kang | |
| 2010/0289884 A1* | 11/2010 | Kang | 348/58 |
| 2011/0157124 A1* | 6/2011 | Jung et al. | 345/211 |
| 2011/0273471 A1* | 11/2011 | Nagasaka et al. | 345/619 |
| 2012/0274748 A1* | 11/2012 | Hwang et al. | 348/51 |

FOREIGN PATENT DOCUMENTS

| | | |
|---|---|---|
| CN | 101888564 | 11/2010 |
| JP | 2002-185983 | 6/2002 |

OTHER PUBLICATIONS

Chinese Office Action dated Jan. 3, 2014 for corresponding Patent Application No. 201110195769.X.

* cited by examiner

*Primary Examiner* — Dave Czekaj
*Assistant Examiner* — David Werner
(74) *Attorney, Agent, or Firm* — Morgan, Lewis & Bockius LLP

(57) ABSTRACT

A stereoscopic image display is discussed. The stereoscopic image display includes a display panel including data lines, gate lines crossing the data lines, thin film transistors (TFTs) that are turned on in response to gate pulses from the gate lines, and a plurality of pixels, a data driving circuit that converts digital video data into a data voltage and supplies the data voltage to the data lines, a gate driving circuit sequentially supplying the gate pulses synchronized with the data voltage to the gate lines, and a timing controller that receives a timing signal, 2D image data, and 3D image data from an external host system, supplies the digital video data to the data driving circuit, and controls an operation timing of the data driving circuit and an operation timing of the gate driving circuit.

10 Claims, 14 Drawing Sheets

STEREOSCOPIC IMAGE DISPLAY

This application claims the benefit of Korean Patent Application No. 10-2010-0124501 filed on Dec. 7, 2010, the entire contents of which is incorporated herein by reference for all purposes as if fully set forth herein.

BACKGROUND OF THE INVENTION

1. Field of the Invention

Embodiments of the invention relate to a stereoscopic image display capable of implementing a two-dimensional plane image (hereinafter referred to as "2D image") and a three-dimensional stereoscopic image (hereinafter referred to as "3D image").

2. Discussion of the Related Art

A stereoscopic image display implements 3D image using a stereoscopic technique or an autostereoscopic technique.

The stereoscopic technique, which uses a parallax image between left and right eyes of a user with a high stereoscopic effect, may include a glasses type method and a non-glasses type method. In the glasses type method, the parallax image between the left and right eyes is displayed on a direct-view display or a projector through a change in a polarization direction of the left and right parallax image or in a time-division manner, and thus a stereoscopic image is implemented using polarization glasses or liquid crystal shutter glasses. In the non-glasses type method, an optical part such as a parallax barrier and a lenticular lens for separating an optical axis of the left and right parallax image is generally installed in front of or behind a display screen, and thus the stereoscopic image is implemented.

FIG. 1 illustrates an example of a stereoscopic image display implemented as a liquid crystal display. As shown in FIG. 1, a glasses type stereoscopic image display implements a stereoscopic image using polarization characteristic of a patterned retarder 5 disposed on a display panel 3 and polarization characteristic of polarization glasses 6 a user wears. The display panel 3 assigns a left eye image L and a right eye image R to adjacent display lines and displays the left and right images L and R. The patterned retarder 5 varies polarization characteristics of the left eye image L and the right eye image R differently from each other and separates polarizations of the left eye image L and the right eye image R. A left eye filter of the polarization glasses 6 transmits the polarization of the left eye image L and intercepts the polarization of the right eye image R. A right eye filter of the polarization glasses 6 transmits the polarization of the right eye image R and intercepts the polarization of the left eye image L. In FIG. 1, a reference numeral 1 denotes a backlight unit providing light to the display panel 3, and reference numerals 2 and 4 denote polarizing films respectively attached to an upper substrate and a lower substrate of the display panel 3.

In the stereoscopic image display shown in FIG. 1, visibility of a 3D image is degraded due to a crosstalk generated at a position of a vertical viewing angle. A left eye of the user has to transmit only light of the left eye image L and a right eye of the user has to transmit only light of the right eye image R, so that the user sufficiently feels a stereoscopic feeling of the 3D image. However, there exists a period in which both light of the left eye image and light of the right eye image are incident on each of the left and right eyes of the user in the related art stereoscopic image display. This may lead to a left/right eye crosstalk in which the user sees both light of the left eye image and light of the right eye image through the user's left or right eye.

When the users does not watch the 3D image in the front of the display panel 3 and looks down or up the 3D image, each of a left eye patterned retarder 5a and a right eye patterned retarder 5b transmits both light of the left eye image and light of the right eye image at a vertical viewing angle greater than a front viewing angle by an angle equal to or greater than a predetermined angle. This may lead to the crosstalk. Thus, the related art stereoscopic image display has the very narrow vertical viewing angle at which the 3D image is displayed without generating the crosstalk.

Thus, as shown in FIG. 2, Japanese Laid Open Publication No. 2002-185983 discloses a method for widening a vertical viewing angle of a stereoscopic image display by forming black stripes BS on a patterned retarder 5. When the users observes the stereoscopic image display at a location spaced apart from a stereoscopic image display by a predetermined distance D, a vertical viewing angle $\alpha$, at which the crosstalk is not theoretically generated, depends on the size of black matrixes BM of a display panel 3, the size of the black stripes BS of the patterned retarder 5, and a distance S between the display panel 3 and the patterned retarder 5. The vertical viewing angle $\alpha$ widens as the size of the black matrixes BM and the size of the black stripes BS increase and as the distance S between the display panel 3 and the patterned retarder 5 decreases. On the other hand, the stereoscopic image display disclosed in Japanese Laid Open Publication No. 2002-185983 interacts the black matrixes BM of the display panel 3, thereby generating Moire. Further, the stereoscopic image display disclosed in Japanese Laid Open Publication No. 2002-185983 displays the 2D image with greatly reduced luminance because of the black stripes BS of the patterned retarder 5.

As shown in FIG. 3, the present applicant has proposed a structure and a driving method of a panel for dividing each of red (R), green (G), and blue (B) subpixels PIX of a display panel into two division cells 10 and 20 and controlling one of the division cells 10 and 20 using an active black stripe in U.S. application Ser. No. 12/536,031 (Aug. 5, 2009) which are hereby incorporated by reference in their entirety. In other words, each of the subpixels PIX is divided into a main pixel part 10 and a subpixel part 20. The main pixel part 10 includes a thin film transistor (TFT) T1 positioned at a crossing between a data line D1 and an n-th gate line Gn and a first liquid crystal cell Clc1 connected to the TFT T1, where n is a natural number. The subpixel part 20 includes a TFT T2 positioned at a crossing between the data line D1 and an (n+1)-th gate line Gn+1 and a second liquid crystal cell Clc2 connected to the TFT T2. The subpixel part 20 operates as a pixel to which 2D image data is written in a 2D mode and may operate as an active black stripe to which black data is written in a 3D mode.

A stereoscopic image display disclosed in U.S. application Ser. No. 12/536,031 can solve the problems of the stereoscopic image display appearing in Japanese Laid Open Publication No. 2002-185983. The stereoscopic image display disclosed in U.S. application Ser. No. 12/536,031 may prevent a luminance reduction of a 2D image by dividing each of the subpixels PIX into two parts and writing the 2D image data to each of the divided pixels PIX in the 2D mode. Further, it may improve the visibility of both the 2D and 3D images by widening a vertical viewing angle in the 3D mode. Hence, it may achieve more excellent display quality than the existing stereoscopic image display.

A gate driving circuit includes a level shifter and a shift register. The shift register may be formed directly on a substrate of a display panel through a Gate In Panel (GIP) process. The level shifter is being developed for the exclusive use of the 2D mode. However, when outputs of the gate driving circuit in the 2D and 3D modes are different from each other, it is impossible to operate the gate driving circuit using only the existing level shifter for the exclusive use of the 2D mode.

SUMMARY OF THE INVENTION

Embodiments of the invention provide a stereoscopic image display including an active black stripe capable of implementing a 2D image and a 3D image and driving a gate driving circuit in 2D and 3D modes using a level shifter.

In one aspect, there is a stereoscopic image display including a display panel including data lines, gate lines crossing the data lines, thin film transistors (TFTs) that are turned on in response to gate pulses from the gate lines, and a plurality of pixels each including a plurality of subpixels, a data driving circuit configured to convert digital video data into a data voltage and supply the data voltage to the data lines, a gate driving circuit configured to sequentially supply the gate pulses synchronized with the data voltage to the gate lines, and a timing controller configured to receive a timing signal, 2D image data, and 3D image data from an external host system, supply the digital video data to the data driving circuit, and control an operation timing of the data driving circuit and an operation timing of the gate driving circuit.

Each subpixel includes a main pixel part configured to represent a gray level of the 2D image data in response to an n-th gate pulse from an n-th gate line in a 2D mode and represent a gray level of the 3D image data in response to the n-th gate pulse in a 3D mode, where n is a natural number, and a subpixel part configured to discharge a previously charged voltage in response to an (n+1)-th gate pulse from an (n+1)-th gate line in the 3D mode and represent a black gray level.

The gate driving circuit outputs the n-th gate pulse in the 2D mode, and outputs the n-th gate pulse and the (n+1)-th gate pulse in the 3D mode in response to a selection signal received from the timing controller or the host system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
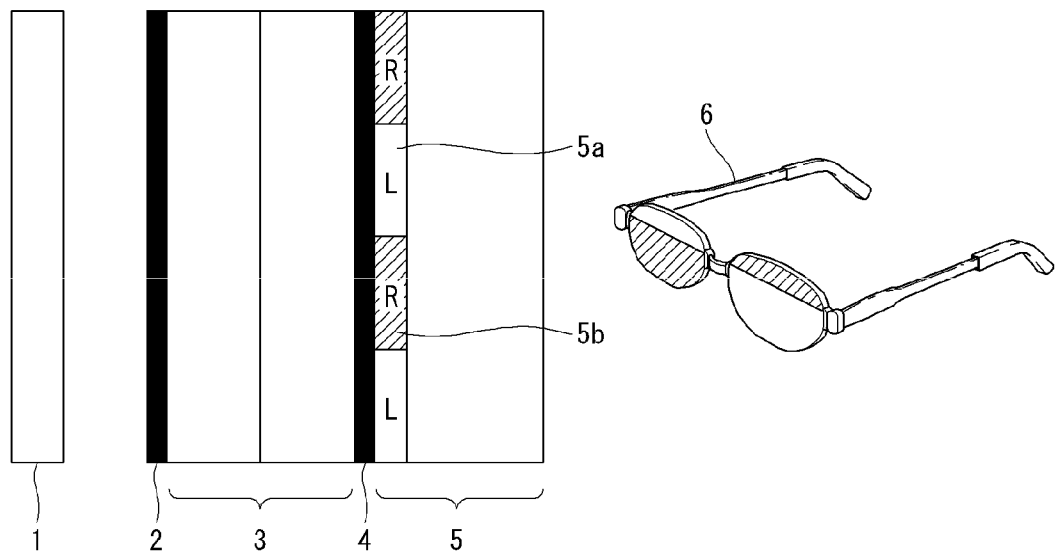
FIG. 1 illustrates a glasses type stereoscopic image display.
Figure 2:
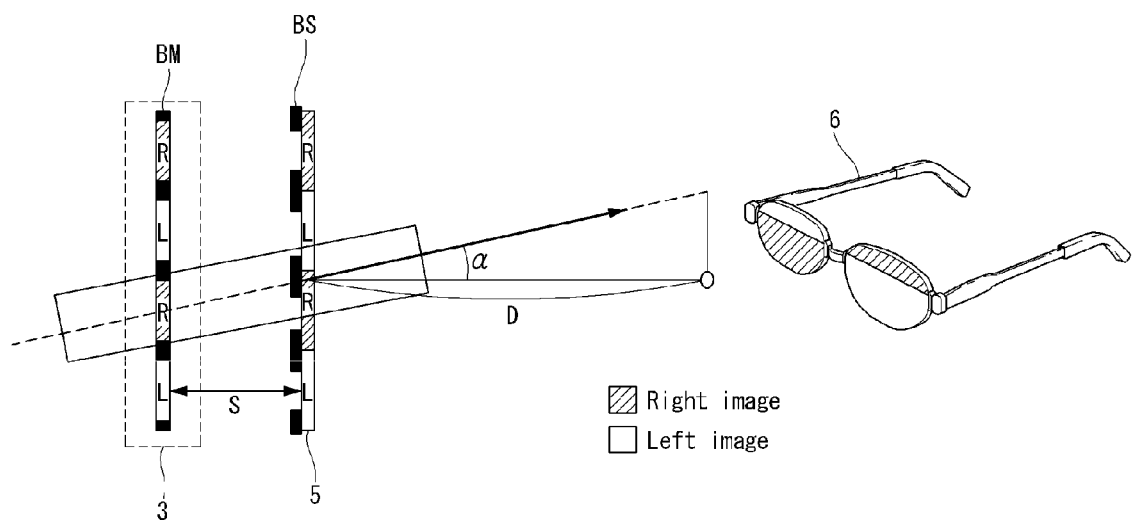
FIG. 2 illustrates a stereoscopic image display in which a black stripe is formed in a patterned retarder.
Figure 3:
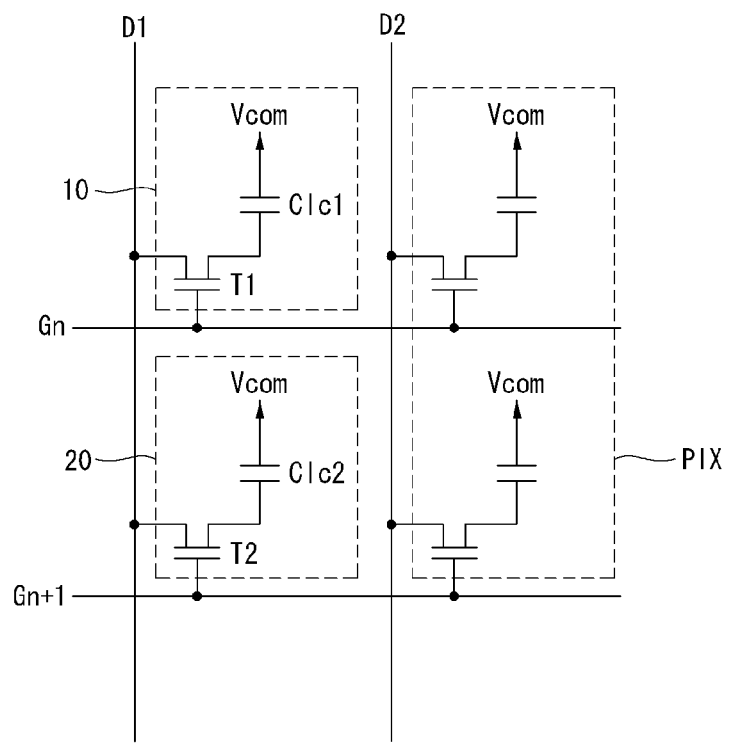
FIG. 3 illustrates a method for implementing an active black matrix.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Figure 4:
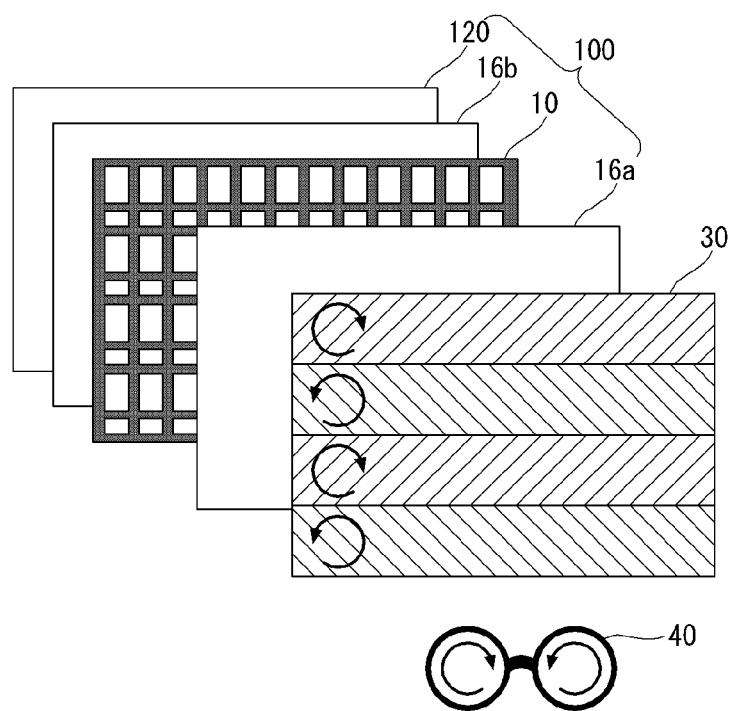
FIG. 4 is an exploded perspective view illustrating a display panel, a patterned retarder, and polarization glasses of a stereoscopic image display according to an example embodiment of the invention.
Figure 5:
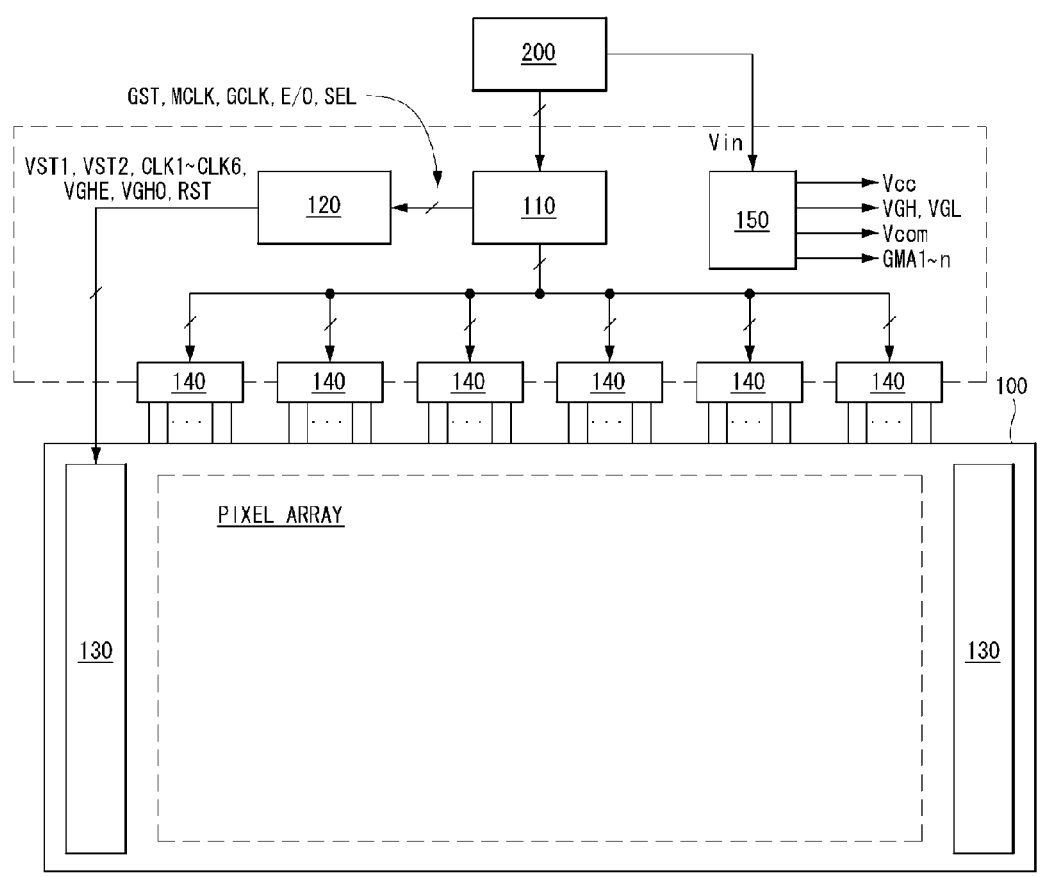
FIG. 5 is a black diagram illustrating driving circuits of a display panel shown in FIG. 4.

FIGS. 4 and 5 illustrate a stereoscopic image display according to an example embodiment of the invention.

As shown in FIGS. 4 and 5, a stereoscopic image display according to an example embodiment of the invention includes a display panel 100, a patterned retarder 30, polarization glasses 40, a display panel driving circuit, and the like.

The display panel 100 displays 2D image data in a 2D mode and 3D image data in a 3D mode. The display panel 100 may be implemented by a flat panel display element such as a liquid crystal display (LCD), a field emission display (FED), a plasma display panel (PDP), an electroluminescence device (EL) including an inorganic electroluminescence element and an organic light emitting diode (OLED) element, and an electrophoretic display (EPD). Polarizing films and a backlight unit may be omitted in a self-emitting display element. Hereinafter, the display panel 100 is described using a display panel of the liquid crystal display as an example. Other kinds of display panels may be used.

Figure 6:
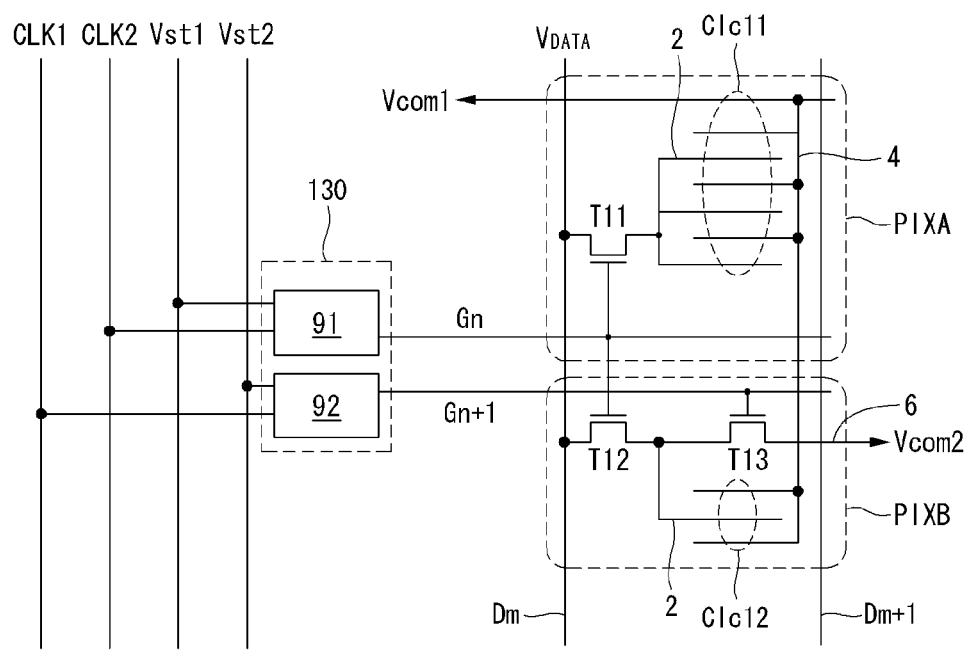
FIG. 6 is an equivalent circuit diagram illustrating some of pixels of a display panel shown in FIG. 4.

The display panel 100 includes a thin film transistor (TFT) array substrate, a color filter array substrate, and a liquid crystal layer between the two substrates. The display panel 100 includes pixels arranged in a matrix form based on a crossing structure of data lines and gate lines. Pixel arrays including active black stripes shown in FIG. 6 are formed on the display panel 100. The TFT array substrate of the display panel 100 includes data lines, gate lines crossing the data lines, TFTs respectively formed at crossings of the data lines and the gate lines, pixel electrodes of liquid crystal cells, storage capacitors Cst connected to the pixel electrodes, and the like. Liquid crystals of the pixels are driven by an electric field between the pixel electrodes connected to the TFTs and common electrodes. The color filter array substrate of the display panel 100 includes black matrixes, color filters, the common electrodes, and the like. Polarizing films 16a and 16b are respectively attached to the TFT array substrate and the color filter array substrate. Alignment layers for setting a pre-tilt angle of the liquid crystals are respectively formed on the TFT array substrate and the color filter array substrate.

The stereoscopic image display according to the embodiment of the invention may be implemented in a vertical electric field driving manner such as a twisted nematic (TN) mode and a vertical alignment (VA) mode or in a horizontal electric field driving manner such as an in-plane switching (IPS) mode and a fringe field switching (FFS) mode. The stereoscopic image display according to the embodiment of the invention may be implemented as any type liquid crystal display including a backlit liquid crystal display, a transflective liquid crystal display, and a reflective liquid crystal display. A backlight unit is necessary in the backlit liquid crystal display and the transflective liquid crystal display. The backlight unit may be implemented as a direct type backlight unit or an edge type backlight unit.

The patterned retarder 30 is attached to the upper polarizing film 16a of the display panel 100 and is positioned opposite the screen of the display panel 100. The patterned retarder 30 includes first retarders and second retarders. The first retarders of the patterned retarder 30 are positioned opposite pixels of the display panel 100, on which a left eye image is displayed, convert light coming from the pixels into a first polarization (for example, circular polarization or linear polarization), and pass through the first polarization. The second retarders of the patterned retarder 30 are positioned opposite pixels of the display panel 100, on which a right eye image is displayed, convert light coming from the pixels into a second polarization (for example, circular polarization or linear polarization), and pass through the second polarization. An optical axis of the first polarization and an optical axis of the second polarization may be perpendicular to each other. A separate black stripe does not have to be formed on the patterned retarder 30. This is because each of the pixels of the display panel 100 is spatially divided into two parts and one of the two parts serves as an active black stripe.

A left eye filter of the polarization glasses 40 has the same light absorption axis as the first retarders of the patterned retarder 30, and a right eye filter of the polarization glasses 40 has the same light absorption axis as the second retarders of the patterned retarder 30. For example, a left circular polarizing filter may be selected as the left eye filter of the polarization glasses 40, and a right circular polarizing filter may be selected as the right eye filter of the polarization glasses 40. Thus, a user views a 3D image using the polarization glasses 40, and views a 2D image without wearing the polarization glasses 40.

The display panel driving circuit includes a data driving circuit, a gate driving circuit, a timing controller 110, a host system 200, a module power circuit 150, and the like.

The data driving circuit includes a plurality of source driver integrated circuits (ICs) 140. The source driver ICs 140 latch digital video data received from the timing controller 110 under the control of the timing controller 110. The source driver ICs 140 convert the latched digital video data into positive and negative analog gamma reference voltages GMA1-GMAn and generate positive and negative data voltages. The source driver ICs 140 then supply the positive and negative data voltages to the data lines of the display panel 100. The source driver ICs 140 may be may be connected to the data lines of the display panel 100 through a chip on glass (COG) process or a tape automated bonding (TAB) process.

The gate driving circuit includes a level shifter 120 and a plurality of shift registers 130 and sequentially supplies a gate pulse to the gate lines of the display panel 100 under the control of the timing controller 110.

The level shifter 120 divides gate shift clocks GCLK received from the timing controller 110 into N-phase clocks and outputs the N-phase clocks, where N is a positive integer equal to or greater than 2. Hereinafter, the clock output by the level shifter 120 is regarded as a 6-phase clock as an example, but is not limited thereto.

The level shifter 120 level-shifts a gate start pulse GST, a gate shift clock GLCK, and a transistor-transistor-logic (TTL) logic level voltage of n clocks, that are received from the timing controller 110, to a gate high voltage VGH and a gate low voltage VGL. The gate high voltage VGH and the gate low voltage VGL are set to an operation voltage of the shift register 130 and an operation voltage of the TFTs of the pixel array of the display panel 100.

The level shifter 120 level-shifts a voltage of the gate start pulse GST and outputs a first start pulse VST1. The level shifter 120 selectively outputs a second start pulse VST2 in response to a selection signal SEL received from the host system 200 or the timing controller 110. The selection signal SEL is generated at a first logic level (for example, a low logic level) in the 2D mode, and is generated at a second logic level (for example, a high logic level) in the 3D mode. The level shifter 120 generates the first start pulse VST1 in the 2D mode where the selection signal SEL having the first logic level is generated. In the 3D mode where the selection signal SEL having the second logic level is generated, the level shifter 120 outputs the first start pulse VST1, and outputs the second start pulse VST2 after a predetermined time passed.

The level shifter 120 reduces the gate high voltage VGH at a falling edge of each of clocks CLK1-CLK6 so as to reduce a voltage $\Delta Vp$ of a liquid crystal cell. The level shifter 120 outputs an even gate high voltage VGHE and an odd gate high voltage VGHO, of which voltage levels are inverted to each other, in response to an even/odd clock E/O received from the timing controller 110.

The level shifter 120 generates a reset pulse RST in response to the gate start pulse GST and the gate shift clock GLCK. The reset pulse RST is a control signal for simultaneously discharging Q nodes at all of stages of the shift register 130.

In the 2D mode, the level shifter 120 outputs the first start pulse VST1, the clocks CLK1 to CLK6, the even gate high voltage VGHE, the odd gate high voltage VGHO, and the reset pulse RST. In the 3D mode, the level shifter 120 outputs the first start pulse VST1, the second start pulse VST2, the clocks CLK1 to CLK6, the even gate high voltage VGHE, the odd gate high voltage VGHO, and the reset pulse RST. Whether or not the level shifter 120 outputs the second start pulse VST2 is determined depending on a logic level of the selection signal SEL received from the timing controller 110 or the host system 200.

Each of the shift registers 130 includes a plurality of stages, that are cascade-connected to one another. The shift registers 130 are formed directly on the TFT array substrate of the display panel 100 along with the pixel array through a Gate In Panel (GIP) process. The shift registers 130 sequentially supply the gate pulse to the gate lines. As shown in FIG. 5, the shift registers 130 may be disposed outside both sides or outside one side of the pixel array. When the shift registers 130 are separately disposed outside both sides of the pixel array, the shift registers 130 simultaneously receive the signals VST1, VST1, CLK1-CLK6, VGHE, and VGEO from one level shifter 120 and operate.

In the 2D mode, the shift register 130 sequentially shifts the first start pulse VST1 received from the level shifter 120 in response to the clocks CLK1-CLK6 and supply the shifted first start pulse VST1 to an n-th gate line. In the 3D mode, the shift register 130 shifts the first start pulse VST1 received from the level shifter 120 in conformity with timing of the clocks CLK1-CLK6 and supply the gate pulse to the n-th gate line. Further, in the 3D mode, the shift register 130 shifts the second start pulse VST2 received from the level shifter 120 in conformity with timing of the clocks CLK1-CLK6 and supply the gate pulse to an (n+1)-th gate line.

The timing control 110 rearranges the digital video data received from the host system 200 and supplies the rearranged digital video data to the source driver ICs 140. The timing control 110 receives timing signals such as a vertical sync signal Vsync, a horizontal sync signal Hsync, a data enable DE, and a dot clock CLK from the host system 200. The timing control 110 generates gate timing control signals for controlling operation timing of the level shifter 120 and source timing control signals for controlling operation timing of the source driver ICs 140 based on the timing signals. The timing control 110 controls the level shifter 120 in the 2D mode or controls the level shifter 120 in the 3D mode in response to a 2D or 3D mode signal received from the host system 200.

The gate timing control signals include the gate start pulse GST, a modulation timing shift clock MCLK, the gate shift clock GLCK, the even/odd clock E/O, the selection signal SEL, and the like. The selection signal SEL may be generated from the timing control 110 or the host system 200. The gate start pulse GST is level-shifted by the level shifter 120 and is converted into the first and second start pulses VST1 and VST2. Further, the gate start pulse GST is input to a first stage of the shift register 130 and controls output timing of a first gate pulse. The modulation timing shift clock MCLK controls gate high voltage modulation timing of the clocks CLK1-CLK6 output from the level shifter 120. The gate shift clock GLCK is divided and level-shifted by the level shifter 120. Further, the gate shift clock GLCK is converted into the clocks CLK1-CLK6 and is input to the stages of the shift register 130, thereby controlling shift timing of the first and second start pulses VST1 and VST2. The even/odd clock E/O controls voltage level inversion timing of the even gate high voltage VGHE and the odd gate high voltage VGHO. The selection signal SEL controls whether or not the level shifter 120 outputs the second start pulse VST2.

The source timing control signal includes a source start pulse SSP, a source sampling clock SSC, a polarity control signal POL, a source output enable SOE, and the like. The source start pulse SSP controls data sampling start timing of the source driver ICs 140. The source sampling clock SSC controls data sampling timing of the source driver ICs 140. The polarity control signal POL controls a polarity of the data voltage output from the data driving circuit. The source output enable SOE controls output timing of the data driving circuit. If the digital video data to be input to the data driving circuit is transferred based on a mini low voltage differential signaling (LVDS) interface standard, the source start pulse SSP and the source sampling clock SSC may be omitted.

The host system 200 includes a graphic processing circuit, such as a scaler, and a power circuit. The graphic processing circuit interpolates a resolution of RGB video data received from a broadcast receiving circuit or an external video source in conformity with a resolution of the display panel 100 and performs a signal interpolation processing on the RGB video data. The power circuit produces an input power source Vin to be supplied to the module power circuit 150. The host system 200 supplies 2D image data or 3D image data to the timing controller 110 through an interface, such as an LVDS interface and a transition minimized differential signaling (TMDS) interface, and supplies the timing signals Vsync, Hsync, DE, and CLK to the timing controller 110. The host system 200 may supply a mode signal for indicating the 2D mode and the 3D mode to the timing controller 110. Further, the host system 200 may transfer the selection signal SEL to the level shifter 120 in synchronization with a 3D image signal transferred to the timing controller 110.

The module power circuit 150 receives the input power source Vin using a DC-DC converter, a regulator, etc., and converts the input power source Vin into a logic power voltage Vcc for driving the display panel driving circuit and the driving voltages VGH, VGL, Vcom, and GMA1-GMAn of the display panel 100. The logic power voltage Vcc is about 3.3 V and is input as a power source of the display panel driving circuit.

Figure 12:
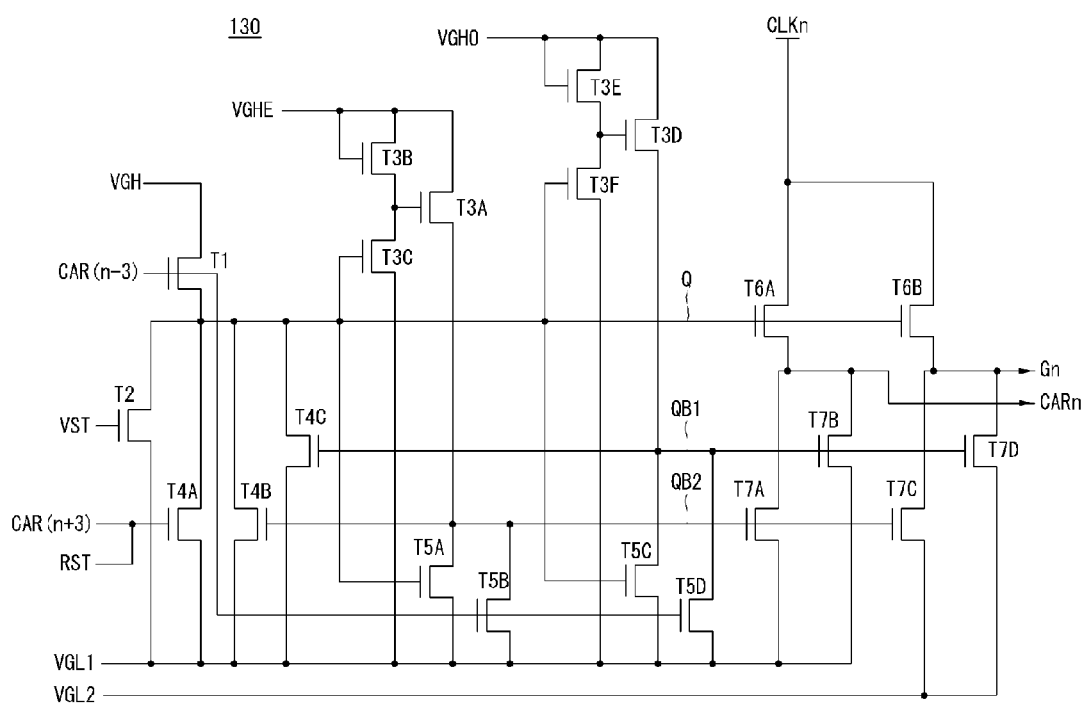
FIG. 12 is a circuit diagram illustrating a stage of a shift register shown in FIG. 4.

The gate high voltage VGH is generated as a voltage equal to or greater than about 15 V, and the gate low voltage VGL is generated as a voltage equal to or less than about −5 V. The gate high voltage VGH may be generated as a voltage of about 28 V. As shown in FIG. 12, the gate low voltage VGL may include first and second gate low voltages VGL1 and VGL2 input to a stage of the shift register 130. The second gate low voltage VGL2 may be set to be less than the first gate low voltage VGL1. The first and second gate low voltages VGL1 and VGL2 and a difference between the first and second gate low voltages VGL1 and VGL2 may be determined depending on a difference between a DC gate bias stress of the TFT, to which a voltage of a first QB node inside the stage of the shift register 130 is applied as a gate voltage, and a DC gate bias stress of the TFT, to which a voltage of a second QB node is applied as a gate voltage.

Figure 10:
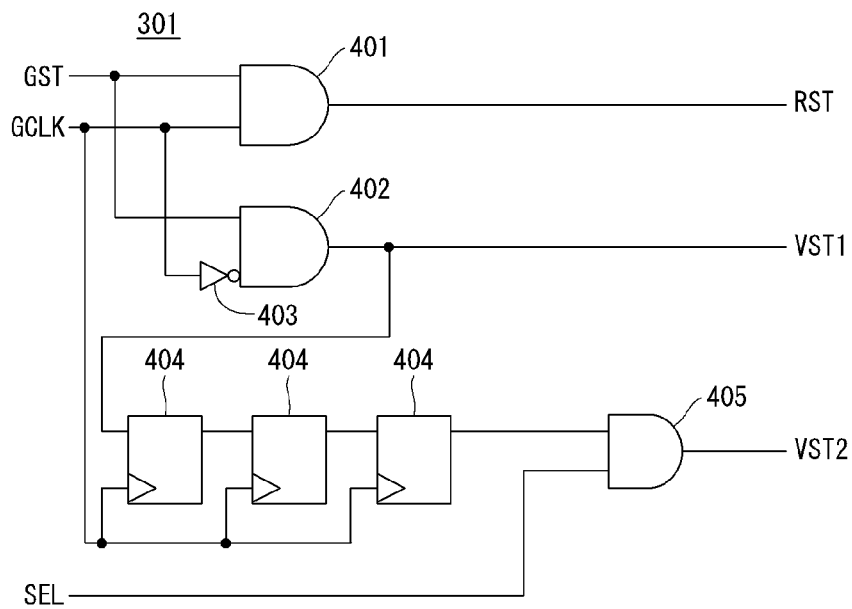
FIG. 10 is a circuit diagram illustrating a first logic circuit unit shown in FIG. 9.

A common voltage Vcom is about 7 V to 9 V and is supplied to the common electrode of the display panel 100 as shown in FIGS. 6 and 10. As shown in FIGS. 6 and 10, the common voltage Vcom may include a first common voltage Vcom1 supplied to a first common electrode 4 belonging to both a main pixel part PIXA and a subpixel part PIXB, and a second common voltage Vcom2 supplied to a second common electrode 6 of the subpixel part PIXB. A difference between the first and second common voltages Vcom1 and Vcom2 may be determined by a voltage compensating for a difference between a $\Delta V_p$ voltage of a liquid crystal cell Clc11 of the main pixel part PIXA and a $\Delta V_p$ voltage of a liquid crystal cell Clc12 of the subpixel part PIXB. For example, in the pixel structure shown in FIG. 6, a TFT parasitic capacitance of the subpixel part PIXB is greater than a TFT parasitic capacitance of the main pixel part PIXA. Because of this, the $\Delta V_p$ voltage $\Delta V_{p2}$ of the subpixel part PIXB may be greater than the $\Delta V_p$ voltage $\Delta V_{p1}$ of the main pixel part PIXA. The second common voltage Vcom2 may be set to be greater than the first common voltage Vcom1 by about 1V to 2V, so as to compensate for the difference between the $\Delta V_p$ voltage $\Delta V_{p1}$ of the main pixel part PIXA and the $\Delta V_p$ voltage $\Delta V_{p2}$ of the subpixel part PIXB.

The positive/negative gamma reference voltages GMA1-GMAn are divided by a voltage division circuit and are input to the source driver ICs 140. The positive/negative gamma reference voltages GMA1-GMAn include positive gamma reference voltages greater than the common voltage Vcom and negative gamma reference voltages less than the common voltage Vcom.

FIG. 6 is an equivalent circuit diagram illustrating some of pixels of the display panel 100 shown in FIG. 4.

As shown in FIG. 6, the pixel array of the display panel 100a includes a plurality of pixels formed at crossings of the data lines Dm and Dm+1 and the gate lines Gn and Gn+1. Each of the pixels includes a red subpixel, a green subpixel, and a blue subpixel. Each of the subpixels is divided into the main pixel part PIXA and the subpixel part PIXB.

The main pixel part PIXA includes a first TFT T11, the first liquid crystal cell Clc11 connected to the first TFT T11, a storage capacitor (not shown), and the like. The first liquid crystal cell Clc11 includes a pixel electrode 2, to which the data voltage is supplied, and the first common electrode 4, to which the first common voltage Vcom1 is supplied.

Figure 7:
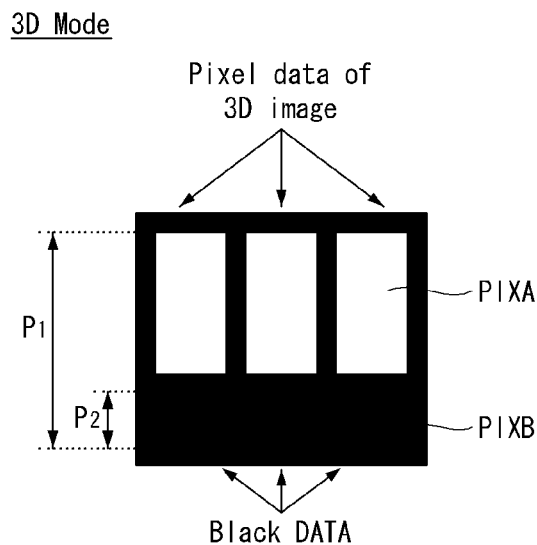
FIG. 7 illustrates operations of first and second division cells in a 3D mode.
Figure 8:
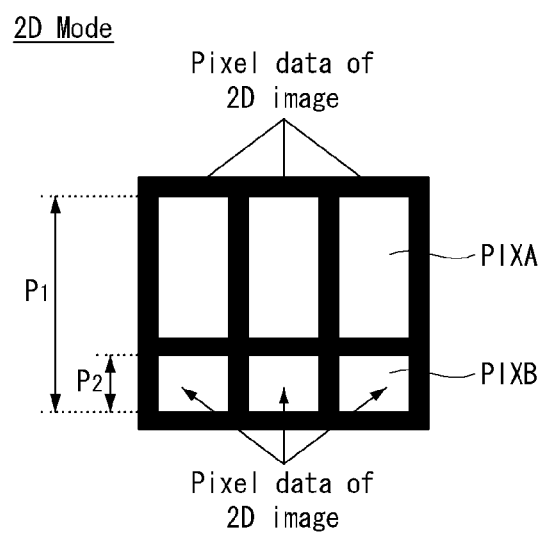
FIG. 8 illustrates operations of first and second division cells in a 2D mode.

As shown in FIG. 7, in the 3D mode, the main pixel part PIXA is charged to a data voltage of a left eye image or a right eye image of a 3D image, thereby displaying 3D image data. As shown in FIG. 8, in the 2D mode, the main pixel part PIXA is charged to a data voltage of a 2D image, thereby displaying 2D image data. The first TFT T11 is turned on in response to the gate pulse from the n-th gate line Gn. Thus, the first TFT T11 supplies a data voltage VDATA from the data line Dm to the pixel electrode 2 of the first liquid crystal cell Clc11 in response to the gate pulse from the n-th gate line Gn. A gate electrode of the first TFT T11 is connected to the n-th gate line Gn, a drain electrode of the first TFT T11 is connected to the data line Dm, and a source electrode of the first TFT T11 is connected to the pixel electrode 2 of the first liquid crystal cell Clc11.

The subpixel part PIXB includes a second TFT T12, a third TFT T13, the second liquid crystal cell Clc12 connected to the third TFT T13, a storage capacitor (not shown), and the like. As shown in FIG. 7, in the 3D mode, the subpixel part PIXB represents a black gray level because a voltage of the pixel electrode 2 is discharged to the second common voltage Vcom2. As shown in FIG. 8, in the 2D mode, the subpixel part PIXB is charged to the data voltage of the 2D image, thereby displaying the 2D image data.

The second TFT T12 is turned on in response to the gate pulse from the n-th gate line Gn. Thus, the second TFT T12 supplies the data voltage VDATA from the data line Dm to the pixel electrode 2 of the second liquid crystal cell Clc12 in response to the gate pulse from the n-th gate line Gn. A gate electrode of the second TFT T12 is connected to the n-th gate line Gn, a drain electrode of the second TFT T12 is connected to the data line Dm, and a source electrode of the second TFT T12 is connected to a drain electrode of the third TFT T13.

In the 3D mode, the third TFT T13 is turned on in response to the gate pulse from the (n+1)-th gate line Gn+1. Thus, the third TFT T13 allows a current to flow between the pixel electrode 2 of the second liquid crystal cell Clc12 and the second common electrode 6, to which the second common voltage Vcom2 is supplied, in response to the gate pulse from the (n+1)-th gate line Gn+1, thereby forming a current path therebetween. As a result, the voltage of the second liquid crystal cell Clc12 is discharge to the second common voltage Vcom2

In the 3D mode, the voltage of the pixel electrode 2 of the second liquid crystal cell Clc12 is substantially equipotential to the voltage of the first common electrode 4. Therefore, the second liquid crystal cell Clc12 is driven in a normally black mode, and the second liquid crystal cell Clc12 represents the black gray level. A gate electrode of the third TFT T13 is connected to the (n+1)-th gate line Gn+1, the drain electrode of the third TFT T13 is connected to the source electrode of the second TFT T12, and a source electrode of the third TFT T13 is connected to the second common electrode 6.

In FIG. 6, a reference numeral "91" denotes an n-th stage of the shift register 130, that outputs the gate pulse to the n-th gate line Gn, and a reference numeral "92" denotes an (n+1)-th stage of the shift register 130, that outputs the gate pulse to the (n+1)-th gate line Gn+1. In the 2D and 3D modes, the n-th stage 91 of the shift register 130 supplies the gate pulse to the n-th gate line Gn in response to the first start pulse VST1 and an n-th clock CLKn. A carry signal as a start pulse input from an (n−4)th stage may be input to a start signal input terminal of the n-th stage 91. In the 2D mode, the second start pulse VST2 is not input to the (n+1)-th stage 92, and the carry signal from the (n−4)th stage is not input to the (n+1)-th stage 92. Therefore, the (n+1)-th stage 92 cannot output the gate pulse in the 2D mode. On the other hand, in the 3D mode, the (n+1)-th stage 92 supplies the gate pulse to the (n+1)-th gate line Gn+1 in response to the second start pulse VST2 and an (n+1)-th clock CLKn+1. A carry signal as a start pulse input from an (n−3)th stage may be input to a start signal input terminal of the (n+1)-th stage 92.

Figure 9:
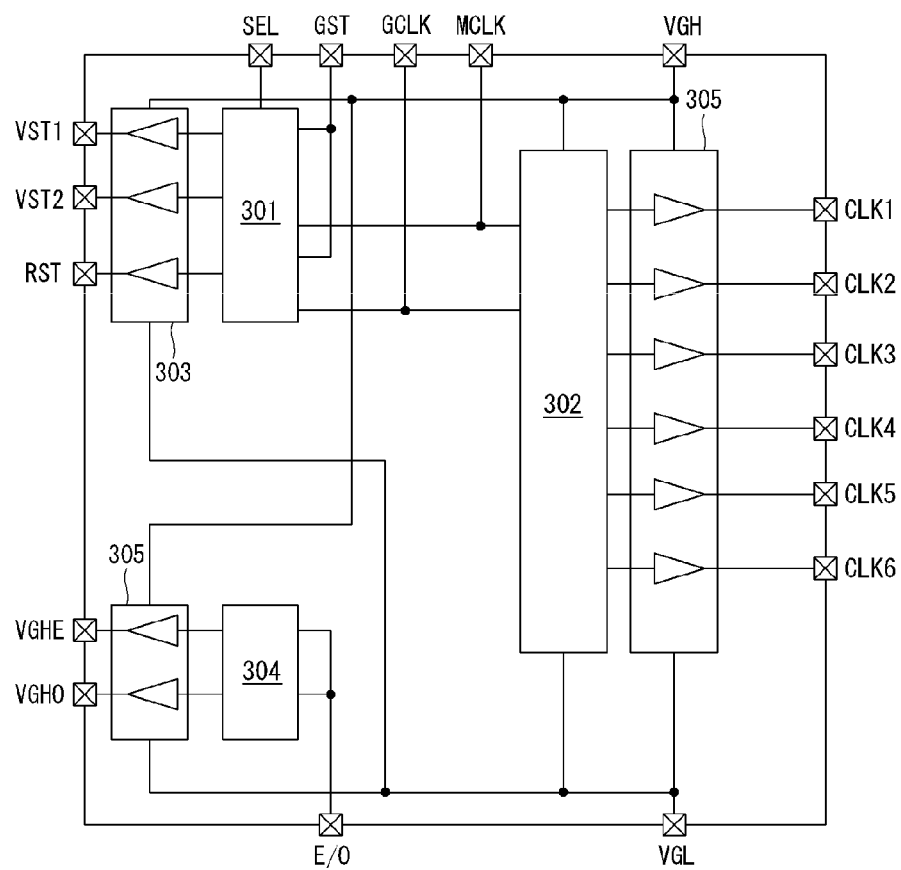
FIG. 9 is a circuit diagram illustrating a level shifter shown in FIG. 4.

FIG. 9 is a circuit diagram illustrating in detail the level shifter 120.

As shown in FIG. 9, the level shifter 120 includes a first logic circuit unit 301, a second logic circuit unit 302, a third logic circuit unit 304, and the like.

The first logic circuit unit 301 receives the gate start pulse GST, the modulation timing shift clock MCLK, the gate shift clock GLCK, the selection signal SEL, the gate high voltage VGH, and the gate low voltage VGL. Hence, in the 2D mode, the first logic circuit unit 301 outputs the first start pulse VST1 and the reset pulse RST, each of which swings between the gate high voltage VGH and the gate low voltage VGL. Further, in the 3D mode, the first logic circuit unit 301 outputs the first start pulse VST1, the second start pulse VST2, and the reset pulse RST, each of which swings between the gate high voltage VGH and the gate low voltage VGL. The signals VST1, VST2, and RST output from the first logic circuit unit 301 are supplied to the shift register 130 through a first buffer array 303.

The second logic circuit unit 302 receives the modulation timing shift clock MCLK, the gate shift clock GLCK, the gate high voltage VGH, and the gate low voltage VGL. Hence, in the 2D and 3D modes, the second logic circuit unit 302 outputs the clocks CLK1-CLK6, each of which swings between the gate high voltage VGH and the gate low voltage VGL, and reduces the gate high voltage VGH at a falling edge of each of the clocks CLK1-CLK6. The clocks CLK1-CLK6 output from the second logic circuit unit 302 are supplied to the shift register 130 through a second buffer array 305.

The third logic circuit unit 304 receives the even/odd clock E/O and outputs a switch control signal for inverting the even gate high voltage VGHE and the odd gate high voltage VGHO between the gate high voltage VGH and the gate low voltage VGL. A third buffer array 305 receives the gate high voltage VGH, the gate low voltage VGL, and the switch control signal output by the third logic circuit unit 304 and outputs the even gate high voltage VGHE and the odd gate high voltage VGHO, each of which swings between the gate high voltage VGH and the gate low voltage VGL. When the even gate high voltage VGHE of the gate high voltage VGH is supplied to the shift register 130, the odd gate high voltage VGHO of the gate low voltage VGL is supplied to the shift register 130. Further, when the even gate high voltage VGHE of the gate low voltage VGL is supplied to the shift register 130, the odd gate high voltage VGHO of the gate high voltage VGH is supplied to the shift register 130. The third buffer array 305 inverts the even gate high voltage level VGHE and the odd gate high voltage level VGHO in response to the switch control signal received from the third logic circuit unit 304.

The even gate high voltage VGHE and the odd gate high voltage VGHO periodically invert voltages applied to first and second QB nodes QB1 and QB2 at each of the stages of the shift register 130, thereby alleviating the DC gate bias stresses of the TFTs receiving the gate voltage using the voltages of the first and second QB nodes QB1 and QB2.

FIG. 10 is a circuit diagram illustrating in detail the first logic circuit unit 301 of the level shifter 120.

As shown in FIG. 10, the first logic circuit unit 301 includes a first AND gate 401, a second AND gate 402, a plurality of D flip-flops 404, a third AND gate 405, and the like.

Figure 16:
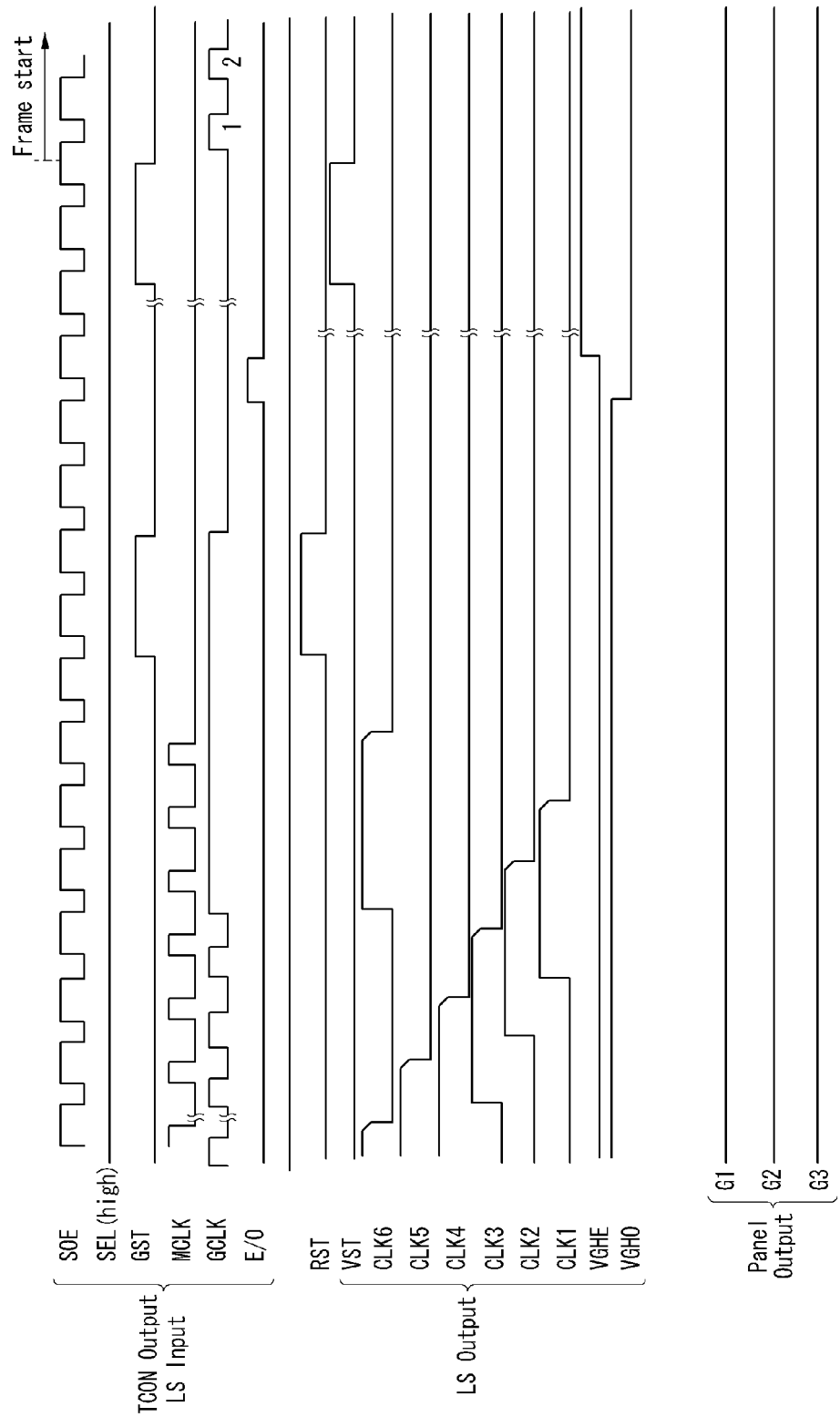
FIG. 16 is a timing diagram illustrating a reset pulse generated after supplying gate pulses to all of gate lines in a stereoscopic image display according to an example embodiment of the invention.

The first AND gate 401 performs an AND operation on the gate start pulse GST and the gate shift clock GLCK and outputs a result of the AND operation as the reset pulse RST. As shown in FIG. 12, the reset pulse RST is simultaneously input to all of the stages of the shift register 130 and simultaneously discharges a Q node of each stage. FIG. 16 illustrates the reset pulse RST produced by the result of the AND operation between the gate start pulse GST and the gate shift clock GLCK.

Figure 14:
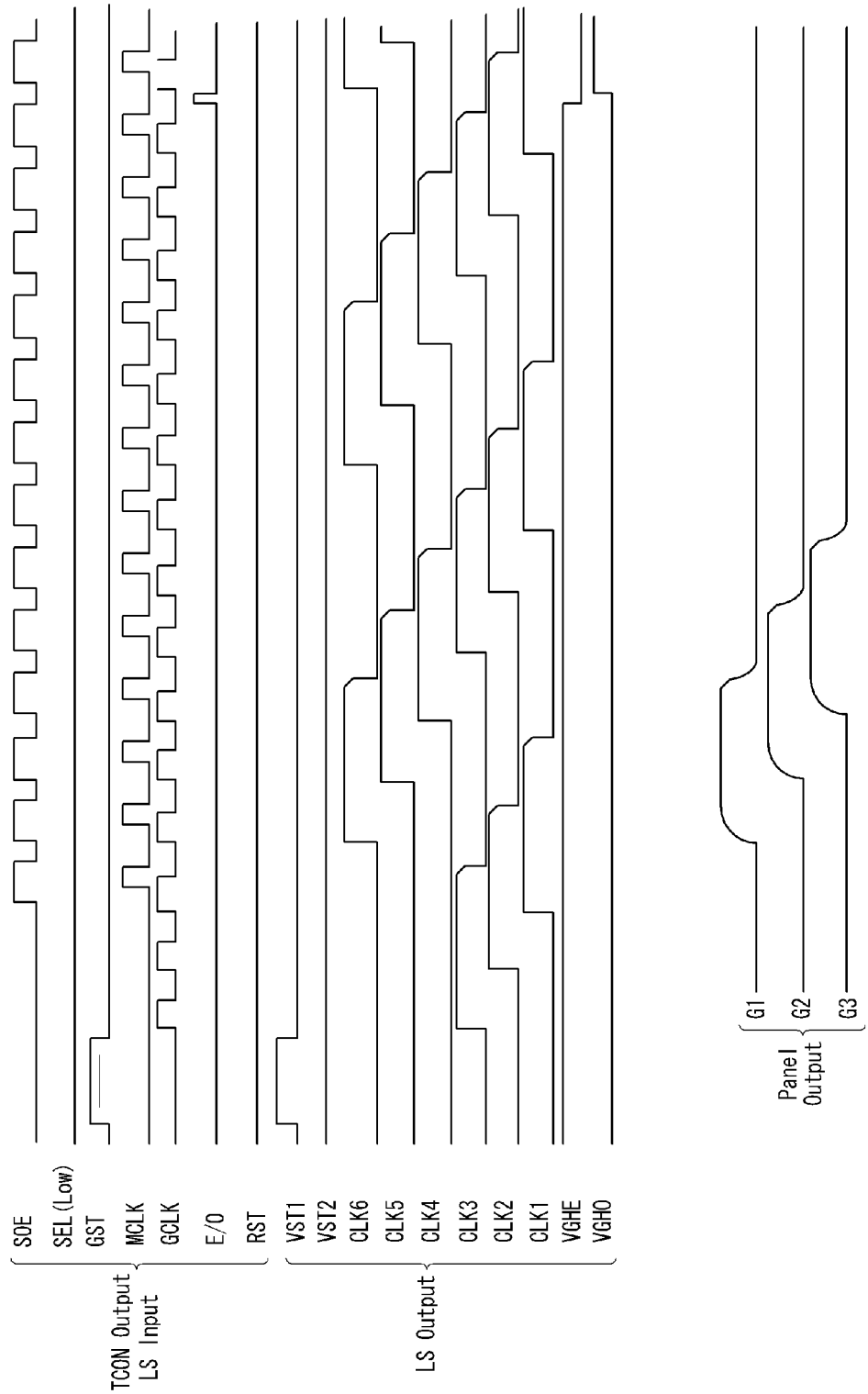
FIG. 14 is a timing diagram illustrating 2D mode driving signals in a stereoscopic image display according to an example embodiment of the invention.
Figure 15:
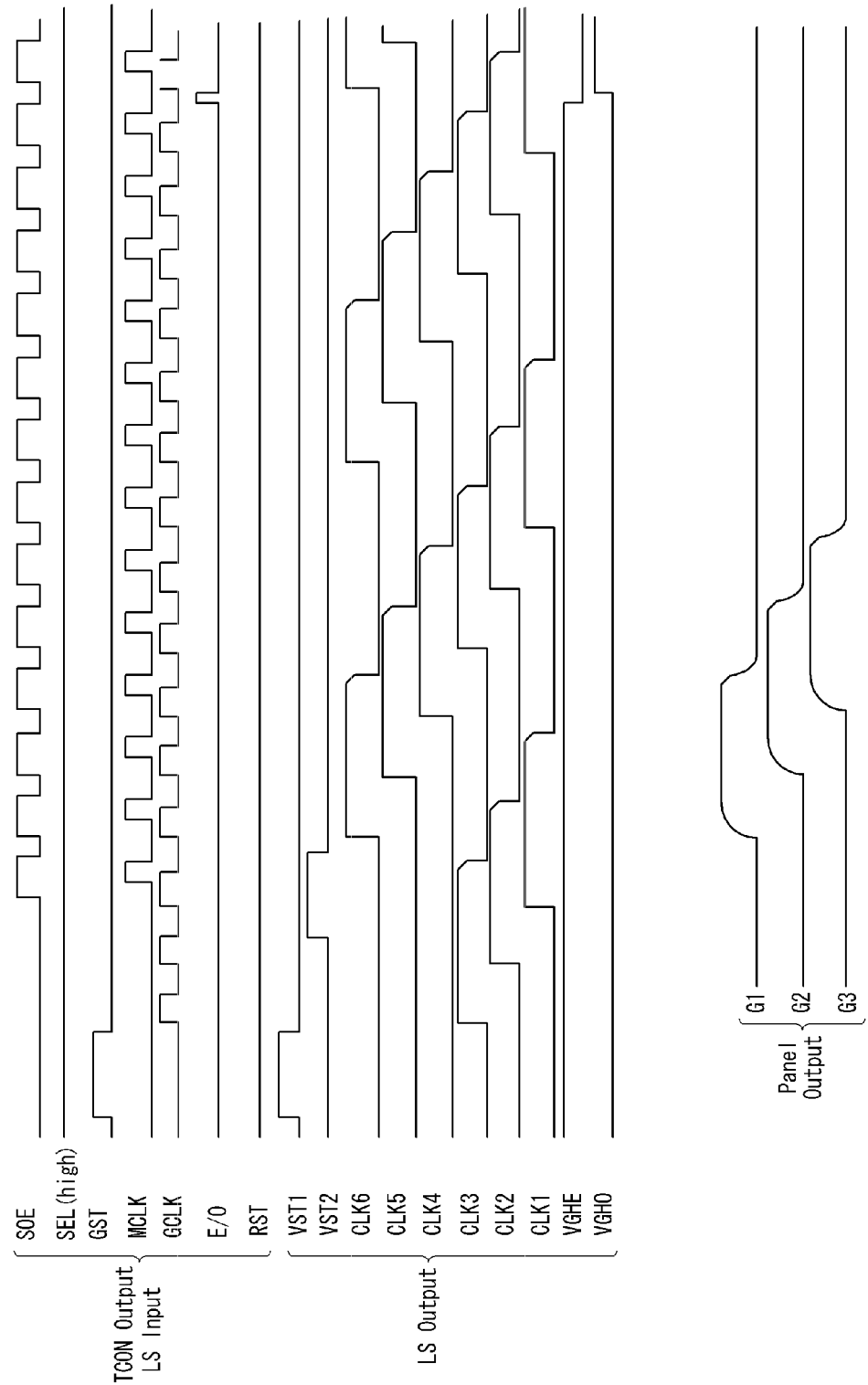
FIG. 15 is a timing diagram illustrating 3D mode driving signals in a stereoscopic image display according to an example embodiment of the invention.

The second AND gate 402 performs an AND operation on the gate start pulse GST and the gate shift clock GLCK inverted by an inverter 403 and outputs a result of the AND operation as the first start pulse VST1. The first start pulse VST1 is input to the first stage of the shift register 130 and controls the output timing of the first gate pulse. FIG. 14 illustrates the first start pulse VST1 generated in the 2D mode, and FIG. 15 illustrates the second start pulse VST2 generated in the 3D mode.

The plurality of D flip-flops 404 are cascade-connected and constitute a retarder circuit for retarding the output of the second AND gate 402 for a predetermined time. In FIG. 10, the cascade-connected D flip-flops 404 retard the first start pulse VST1 output by the second AND gate 402 during about three horizontal periods in response to three successively output gate shift clocks GCLK.

The third AND gate 405 performs an AND operation on the first start pulse VST1 retarded by the retarder circuit including the plurality of D flip-flops 404 and the selection signal SEL and outputs a result of the AND operation as the second start pulse VST2 in the 3D mode. As shown in FIG. 15, when the selection signal SEL of the high logic level is generated in the 3D mode, the third AND gate 405 generates the second start pulse VST2, that is retarded from the first start pulse VST1 for a predetermined time. On the other hand, as shown in FIG. 14, the third AND gate 405 holds the output of the low logic level in the 2D mode where the output of the selection signal SEL is held at the low logic level.

Figure 11:
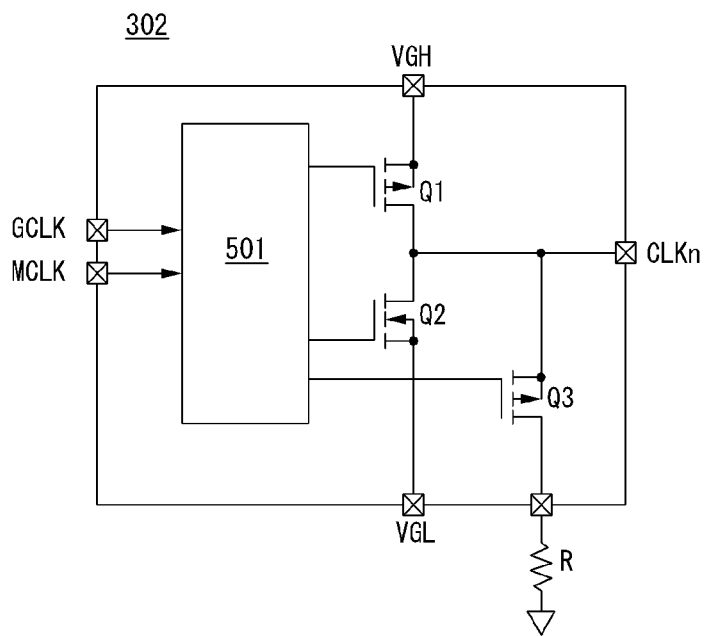
FIG. 11 is a circuit diagram illustrating a second logic circuit unit shown in FIG. 9.

FIG. 11 is a circuit diagram illustrating in detail the second logic circuit unit 302 of the level shifter 120.

As shown in FIG. 11, the second logic circuit unit 302 includes a plurality of modulation circuits for modulating a voltage of each of the clocks CLK1-CLK6. Each of the plurality of modulation circuits includes a control logic unit 501, first to third transistors Q1-Q3, and the like. The first and third transistors Q1 and Q3 may be implemented as an n-type metal-oxide semiconductor field-effect transistor (MOSFET), and the second transistor Q2 may be implemented as a p-type MOSFET.

The control logic unit 501 receives the gate shift clock GLCK and the modulation timing shift clock MCLK and turns on the first transistor Q1 in synchronization with a rising edge of the gate shift clock GLCK, thereby rising the clock CLKn input to the shift register 130. As shown in FIGS. 14 and 15, the clock CLKn is held at the gate high voltage during about three horizontal periods under the control of the control logic unit 501. Subsequently, the control logic unit 501 turns on the third transistor Q3 in synchronization with a falling edge of the gate shift clock GLCK and adjusts a voltage of the clock CLKn as a voltage that is less than the gate high voltage VGH and is greater than the gate low voltage VGL. Subsequently, the control logic unit 501 turns on the second transistor Q2 in synchronization with a falling edge of the modulation timing shift clock MCLK and falls the voltage of the clock CLKn to the gate low voltage VGL.

The first transistor Q1 is turned on at the rising edge of the gate shift clock GLCK under the control of the control logic unit 501 and is held in a turned-on state during about three horizontal periods, thereby outputting the voltage of the clock CLKn as the gate high voltage VGH. A gate electrode of the first transistor Q1 is connected to a first output terminal of the control logic unit 501, the gate high voltage VGH is supplied to a source electrode of the first transistor Q1, and a drain electrode of the first transistor Q1 is connected to an output terminal of the second logic circuit unit 302.

The second transistor Q2 is turned on at the falling edge of the modulation timing shift clock MCLK under the control of the control logic unit 501 and falls the voltage of the clock CLKn to the gate low voltage VGL. A gate electrode of the second transistor Q2 is connected to a second output terminal of the control logic unit 501, the gate low voltage VGL is supplied to a source electrode of the second transistor Q2, and a drain electrode of the second transistor Q2 is connected to the output terminal of the second logic circuit unit 302.

The third transistor Q3 is turned on at the falling edge of the gate shift clock GLCK under the control of the control logic unit 501 and reduces the gate high voltage VGH of the clock unit CLKn. A gate electrode of the third transistor Q3 is connected to a third output terminal of the control logic unit 501, the gate low voltage VGL is supplied to a source electrode of the third transistor Q3 via a resistance R, and a drain electrode of the third transistor Q3 is connected to the output terminal of the second logic circuit unit 302. The resistance R drops the gate high voltage VGH when the third transistor Q3 is turned on, and reduces the gate high voltage VGH output from the second logic circuit unit 302.

The shift register 130 according to the embodiment of the invention may be variously implemented.

Figure 13:
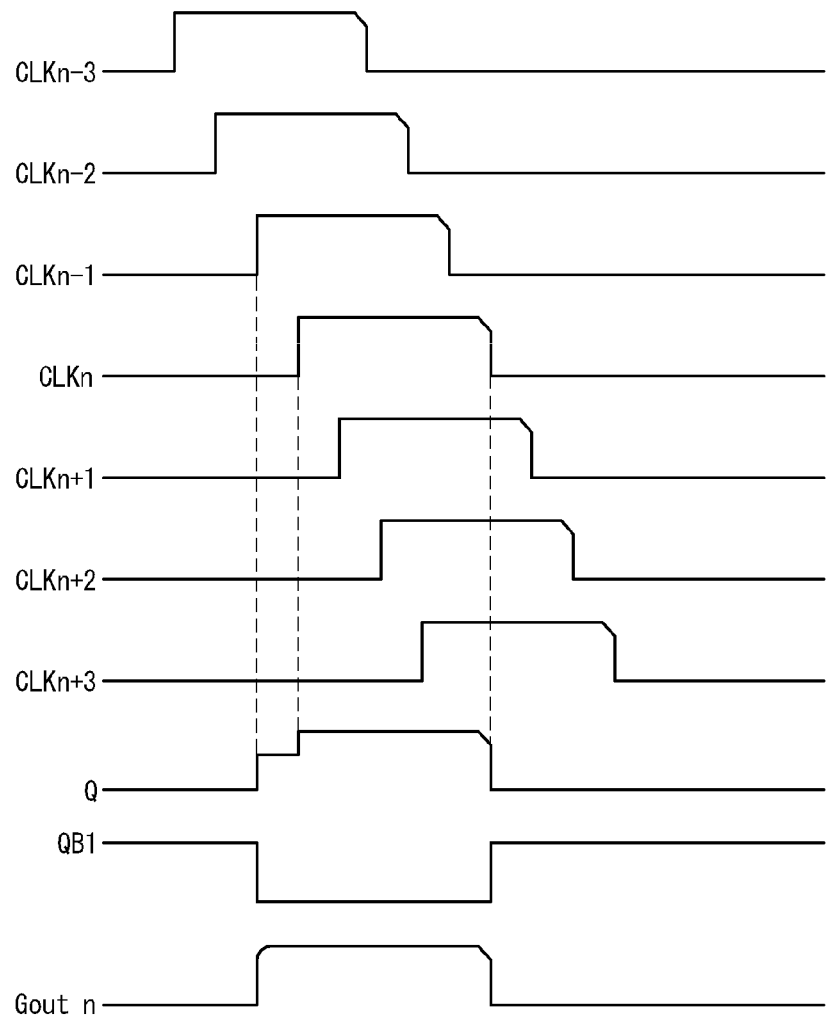
FIG. 13 is a waveform diagram illustrating an output waveform of a clock, a Q node voltage, a QB node voltage, and a gate pulse input to a stage of a shift register shown in FIG. 12.

FIG. 12 is a circuit diagram illustrating in detail an example stage of the shift register 130. FIG. 13 is a waveform diagram illustrating an output waveform of a clock, a Q node voltage, a QB node voltage, and a gate pulse input to the stage shown in FIG. 12. The shift register 130 according to the embodiment of the invention may have various circuit configurations other than the circuit configuration shown FIG. 12.

The shift register 130 includes a plurality of cascade-connected stages.

One or two of the clocks CLK1-CLK6, each of which is shifted by a predetermined phase difference and swings between the gate high voltage VGH and the gate low voltage VGL, are input to the stages of the shift register 130. FIG. 12 illustrating the stage configured so that the gate pulse supplied to the n-th gate line Gn is output in response to the n-th clock CLKn.

As shown in FIGS. 12 and 13, the first and second start pulses VST1 and VST2 or an (n−1)th carry signal output from an (n−1)th stage are input to a start terminal of the n-th stage. The reset pulse RST and an (n+3)th carry signal CAR(n+3) are input to a reset terminal of the n-th stage. The driving voltages such as the gate high voltage VGH, the even gate high voltage VGHE, the odd gate high voltage VGHO, and the first and second gate low voltages VGL1 and VGL2 are supplied to the n-th stage.

The n-th stage is connected to the n-th gate line Gn of the display panel 100. The n-th stage includes a first output terminal for outputting the gate pulse supplied to the n-th gate line Gn and a second output terminal for outputting an n-th carry signal CARn. The n-th stage further includes a Q node Q for controlling a pull-up transistor T6B connected to the first output terminal and a pull-up transistor T6A connected to the second output terminal, a first QB node QB1 for controlling pull-down transistors T7B and T7D connected to the first output terminal, a second QB node QB2 for controlling pull-down transistors T7A and T7C connected to the second output terminal, and switch circuits T1, T2, T3A-T3F, T4A-T4C, and T5A-T5D.

The first TFT T1 supplies the gate high voltage VGH to the Q node Q in response to an (n−3)th carry signal CAR(n−3) output from an (n−3)th stage. The (n−3)th carry signal CAR(n−3) is supplied to a gate electrode of the first TFT T1, the gate high voltage VGH is supplied to a drain electrode of the first TFT T1, and a source electrode of the first TFT T1 is connected to the Q node Q.

The second TFT T2 discharges the voltage of the Q node Q in response to the first and second start pulses VST1 and VST2. The first and second start pulses VST1 and VST2 are supplied to a gate electrode of the second TFT T2, a drain electrode of the second TFT T2 is connected to the Q node Q, and the gate low voltage VGL is supplied to a source electrode of the second TFT T2.

The 3A, 3B, and 3C TFTs T3A, T3B, and T3C supply the even gate high voltage VGHE to the second QB node QB2 during a period in which the voltage of the Q node Q is discharged to a voltage less than the gate high voltage VGH. A gate electrode of the 3A TFT T3A is connected to a node between a source electrode of the 3B TFT T3B and a drain electrode of the 3C TFT T3C. The even gate high voltage VGHE is supplied to a drain electrode of the 3A TFT T3A, and a source electrode of the 3A TFT T3A is connected to the second QB node QB2. The even gate high voltage VGHE is supplied to a gate electrode and a drain electrode of the 3B TFT T3B. The source electrode of the 3B TFT T3B is connected to the gate electrode of the 3A TFT T3A and the drain electrode of the 3C TFT T3C. A gate electrode of the 3C TFT T3C is connected to the Q node Q, and the first gate low voltage VGL1 is supplied to a source electrode of the 3C TFT T3C.

The 3D, 3E, and 3F TFTs T3D, T3E, and T3F supply the odd gate high voltage VGHO to the first QB node QB1 during a period in which the voltage of the Q node Q is discharged to a voltage less than the gate high voltage VGH. A gate electrode of the 3D TFT T3D is connected to a node between a source electrode of the 3E TFT T3E and a drain electrode of the 3F TFT T3F. The odd gate high voltage VGHO is supplied to a drain electrode of the 3D TFT T3D, and a source electrode of the 3D TFT T3D is connected to the first QB node QB1. The odd gate high voltage VGHO is supplied to a gate electrode and a drain electrode of the 3E TFT T3E. The source electrode of the 3E TFT T3E is connected to the gate electrode of the 3D TFT T3D and the drain electrode of the 3F TFT T3F. A gate electrode of the 3F TFT T3F is connected to the Q node Q, and the first gate low voltage VGL1 is supplied to a source electrode of the 3F TFT T3F.

The 4A TFT T4A discharges the voltage of the Q node Q in response to the reset pulse RST and an (n+3)th carry signal CAR(n+3) output from an (n+3)th stage. The reset pulse RST and the (n+3)th carry signal CAR(n+3) are supplied to a gate electrode of the 4A TFT T4A, a drain electrode of the 4A TFT T4A is connected to the Q node Q, and the first gate low voltage VGL1 is supplied to a source electrode of the 4A TFT T4A. The 4B TFT T4B discharges the voltage of the Q node Q in response to the voltage of the second QB node QB2. A gate electrode of the 4B TFT T4B is connected to the second QB node QB2, a drain electrode of the 4B TFT T4B is connected to the Q node Q, and the first gate low voltage VGL1 is supplied to a source electrode of the 4B TFT T4B. The 4C TFT T4C discharges the voltage of the Q node Q in response to the voltage of the first QB node QB1. A gate electrode of the 4C TFT T4C is connected to the first QB node QB1, a drain electrode of the 4C TFT T4C is connected to the Q node Q, and the first gate low voltage VGL1 is supplied to a source electrode of the 4C TFT T4C.

The 5A TFT T5A discharges the voltage of the second QB node QB2 in response to the voltage of the Q node Q. A gate electrode of the 5A TFT T5A is connected to the Q node Q, a drain electrode of the 5A TFT T5A is connected to the second QB node QB2, and the first gate low voltage VGL1 is supplied to a source electrode of the 5A TFT T5A. The 5B TFT T5B discharges the voltage of the second QB node QB2 in response to the (n−3)th carry signal CAR(n−3) output from the (n−3)th stage. The (n−3)th carry signal CAR(n−3) is supplied to a gate electrode of the 5B TFT T5B, a drain electrode of the 5B TFT T5B is connected to the second QB node QB2, and the first gate low voltage VGL1 is supplied to a source electrode of the 5B TFT T5B.

The 5C TFT T5C discharges the voltage of the first QB node QB1 in response to the voltage of the Q node Q. A gate electrode of the 5C TFT T5C is connected to the Q node Q, a drain electrode of the 5C TFT T5C is connected to the first QB node QB1, and the first gate low voltage VGL1 is supplied to a source electrode of the 5C TFT T5C. The 5D TFT T5D discharges the voltage of the first QB node QB1 in response to the voltage of the (n−3)th carry signal CAR(n−3) output from the (n−3)th stage. The (n−3)th carry signal CAR(n−3) is supplied to a gate electrode of the 5D TFT T5D, a drain electrode of the 5D TFT T5D is connected to the first QB node QB1, and the first gate low voltage VGL1 is supplied to a source electrode of the 5D TFT T5D.

The 6A TFT T6A is a pull-up transistor for outputting the n-th carry signal CARn when the Q node Q is charged and the n-th clock CLKn is input. A gate electrode of the 6A TFT T6A is connected to the Q node Q, the n-th clock CLKn is supplied to a drain electrode of the 6A TFT T6A, and a source electrode of the 6A TFT T6A is connected to the second output terminal of the n-th stage.

The 6B TFT T6B is a pull-up transistor for outputting the gate pulse supplied to the n-th gate line Gn when the Q node Q is charged and the n-th clock CLKn is input. A gate electrode of the 6B TFT T6B is connected to the Q node Q, the n-th clock CLKn is supplied to a drain electrode of the 6B TFT T6B, and a source electrode of the 6B TFT T6B is connected to the first output terminal of the n-th stage.

The 7A TFT T7A is turned on when the second QB node QB2 is charged, and discharges the voltage of the second output terminal of the n-th stage, thereby falling the n-th carry signal CARn. A gate electrode of the 7A TFT T7A is connected to the second QB node QB2, a drain electrode of the 7A TFT T7A is connected to the second output terminal of the n-th stage, and the first gate low voltage VGL1 is supplied to a source electrode of the 7A TFT T7A. The 7B TFT T7B is turned on when the first QB node QB1 is charged, and discharges the voltage of the second output terminal of the n-th stage, thereby falling the n-th carry signal CARn. A gate electrode of the 7B TFT T7B is connected to the first QB node QB1, a drain electrode of the 7B TFT T7B is connected to the second output terminal of the n-th stage, and the first gate low voltage VGL1 is supplied to a source electrode of the 7B TFT T7B.

The 7C TFT T7C is turned on when the second QB node QB2 is charged, and discharges the voltage of the first output terminal of the n-th stage, thereby falling the gate pulse supplied to the n-th gate line Gn. A gate electrode of the 7C TFT T7C is connected to the second QB node QB2, a drain electrode of the 7C TFT T7C is connected to the first output terminal of the n-th stage, and the second gate low voltage VGL2 is supplied to a source electrode of the 7C TFT T7C. The 7D TFT T7D is turned on when the first QB node QB1 is charged, and discharges the voltage of the first output terminal of the n-th stage, thereby falling the gate pulse supplied to the n-th gate line Gn. A gate electrode of the 7D TFT T7D is connected to the first QB node QB1, a drain electrode of the 7D TFT T7D is connected to the first output terminal of the n-th stage, and the second gate low voltage VGL2 is supplied to a source electrode of the 7D TFT T7D.

FIG. 14 is a timing diagram illustrating 2D mode driving signals in the stereoscopic image display according to the example embodiment of the invention. FIG. 15 is a timing diagram illustrating 3D mode driving signals in the stereoscopic image display according to the example embodiment of the invention. FIG. 16 is a timing diagram illustrating the reset pulse generated after supplying the gate pulses to all of the gate lines in the stereoscopic image display according to the example embodiment of the invention. In FIGS. 14 to 16, "TCON" denotes the timing controller 110, and "LS" denotes the level shifter 120.

As described above, the stereoscopic image display including the active black stripe according to the embodiment of the invention may reduce the number of level shifting operations required to implement the 2D or 3D image using the level shifter, that selectively outputs the second start pulse in response to the selection signal received from the timing controller or the host system.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display panel including data lines, gate lines crossing the data lines, thin film transistors (TFTs) that are turned on in response to gate pulses from the gate lines, and a plurality of pixels each including a plurality of subpixels;
   a data driving circuit configured to convert digital video data into a data voltage and supply the data voltage to the data lines;
   a gate driving circuit configured to sequentially supply the gate pulses synchronized with the data voltage to the gate lines; and
   a timing controller configured to receive a timing signal, 2D image data, and 3D image data from an external host system, supply the digital video data to the data driving circuit, and control an operation timing of the data driving circuit and an operation timing of the gate driving circuit,
   wherein each subpixel includes:
   a main pixel part configured to represent a gray level of the 2D image data in response to an n-th gate pulse from an n-th gate line in a 2D mode and represent a gray level of the 3D image data in response to the n-th gate pulse in a 3D mode, where n is a natural number; and
   a subpixel part configured to discharge a previously charged voltage in response to an (n+1)-th gate pulse from an (n+1)-th gate line in the 3D mode and represent a black gray level,
   wherein the gate driving circuit outputs the n-th gate pulse and does not output the (n+1)-th gate pulse in the 2D mode, and outputs the n-th gate pulse and the (n+1)-th gate pulse in the 3D mode in response to a selection signal received from the timing controller or the host system.

2. The stereoscopic image display of claim 1, wherein the subpixel part represents the gray level of the 2D image data in response to the n-th gate pulse in the 2D mode.

3. The stereoscopic image display of claim 1, wherein the gate driving circuit includes:
   a level shifter configured to receive a gate start pulse, a gate shift clock, a modulation timing shift clock, and an even/odd clock from the timing controller, receive the selection signal from the timing controller or the host system, output a first start pulse in response to the gate start pulse in the 2D and 3D modes, output clocks in response to the gate shift clock in the 2D and 3D modes, and output a second start pulse, that is retarded from the first start pulse for a predetermined time, along with the first start pulse and the clocks in response to the selection signal in the 3D mode; and
   a shift register configured to output the n-th gate pulse in response to the first start pulse and the clocks received from the level shifter in the 2D mode, output the n-th gate pulse in response to the first start pulse and the clocks in the 3D mode, and output the (n+1)-th gate pulse in response to the second start pulse and the clocks in the 3D mode.

4. The stereoscopic image display of claim 3, wherein the level shifter inverts an even gate high voltage level and an odd gate high voltage level, that are input to the shift register, in response to the even/odd clock.

5. The stereoscopic image display of claim 4, wherein the shift register charges a first QB node for reducing a voltage of an output terminal outputting the gate pulses to the odd gate high voltage level and charges a second QB node for reducing the voltage of the output terminal outputting the gate pulses to the even gate high voltage level,
   wherein when the even gate high voltage level is a gate high voltage, the odd gate high voltage level is a gate low voltage less than the gate high voltage,
   wherein when the even gate high voltage level is the gate low voltage, the odd gate high voltage level is the gate high voltage.

6. The stereoscopic image display of claim 3, wherein the level shifter performs an AND operation on the gate start pulse and the gate shift clock in the 2D and 3D modes to output a reset pulse.

7. The stereoscopic image display of claim 6, wherein the shift register discharges a voltage of a Q node for increasing a voltage of an output terminal outputting the gate pulses in response to the reset pulse.

8. The stereoscopic image display of claim 3, wherein the level shifter includes:
   a first logic circuit unit configured to receive the gate start pulse, the gate shift clock, the modulation timing shift clock, the selection signal, a gate high voltage, and a gate low voltage less than the gate high voltage, output the first start pulse and a reset pulse, each of which swings between the gate high voltage and the gate low voltage, in the 2D mode, and output the first start pulse, the second start pulse, and the reset pulse, each of which swings between the gate high voltage and the gate low voltage, in the 3D mode;

a second logic circuit unit configured to receive the gate shift clock, the modulation timing shift clock, the gate high voltage, and the gate low voltage, output the clocks, each of which swings between the gate high voltage and the gate low voltage, in the 2D and 3D modes, and reduce the gate high voltage at a falling edge of each of the clocks; and a third logic circuit unit configured to receive the even/odd clock and invert an even gate high voltage level and an odd gate high voltage level.

9. The stereoscopic image display of claim 8, wherein the shift register charges a first QB node for reducing a voltage of an output terminal outputting the gate pulses to the odd gate high voltage level and charges a second QB node for reducing the voltage of the output terminal outputting the gate pulses to the even gate high voltage level, wherein when the even gate high voltage level is the gate high voltage, the odd gate high voltage level is the gate low voltage less than the gate high voltage, wherein when the even gate high voltage level is the gate low voltage, the odd gate high voltage level is the gate high voltage.

10. The stereoscopic image display of claim 1, further comprising:

a patterned retarder including a first retarder and a second retarder, each of which is attached to the display panel, the first retarder converting light of a left eye image of a 3D image into a first polarization and passing through the first polarization, the second retarder converting light of a right eye image of the 3D image into a second polarization and passing through the second polarization; and polarization glasses including a left eye filter passing through the first polarization and a right eye filter passing through the second polarization.

* * * * *